US007921564B2

(12) United States Patent
Baudart et al.

(10) Patent No.: US 7,921,564 B2
(45) Date of Patent: Apr. 12, 2011

(54) METHOD OF ASSEMBLING A CROSSBAR WITH A DASHBOARD, AND A CENTERING DEVICE

(75) Inventors: Laurent Baudart, Fresnoy en Thelle (FR); Albin Descamps, Gisors (FR)

(73) Assignee: Faurecia Interieur Industrie, Nanterre (FR)

( * ) Notice: Subject to any disclaimer, the term of this patent is extended or adjusted under 35 U.S.C. 154(b) by 680 days.

(21) Appl. No.: 12/065,920

(22) PCT Filed: Sep. 4, 2006

(86) PCT No.: PCT/FR2006/002030
§ 371 (c)(1),
(2), (4) Date: Mar. 6, 2008

(87) PCT Pub. No.: WO2007/028884
PCT Pub. Date: Mar. 15, 2007

(65) Prior Publication Data
US 2008/0238128 A1    Oct. 2, 2008

(30) Foreign Application Priority Data
Sep. 6, 2005   (FR) .................................... 05 09091

(51) Int. Cl.
*B21D 53/88*   (2006.01)
(52) U.S. Cl. ... 29/897.2; 29/428; 29/525.01; 29/525.02; 29/525.11; 296/70; 296/72; 296/193.02
(58) Field of Classification Search ................. 29/897.2, 29/428, 525.01, 525.02, 525.11; 296/70, 296/72, 193.02
See application file for complete search history.

(56) References Cited

U.S. PATENT DOCUMENTS

| | | | | |
|---|---|---|---|---|
| 5,269,060 A | * | 12/1993 | Dowd et al. | 29/897.2 |
| 2001/0047899 A1 | * | 12/2001 | Ikeda | 180/90 |
| 2003/0193207 A1 | * | 10/2003 | Ito et al. | 296/72 |
| 2011/0005054 A1 | * | 1/2011 | Maurell et al. | 29/428 |

FOREIGN PATENT DOCUMENTS

| | | |
|---|---|---|
| DE | 41 34 436 | 4/1992 |
| DE | 197 39 870 | 3/1999 |
| EP | 0 296 961 | 12/1988 |
| EP | 0 694 465 | 1/1996 |

* cited by examiner

*Primary Examiner* — Derris H Banks
*Assistant Examiner* — Azm Parvez
(74) *Attorney, Agent, or Firm* — Young & Thompson

(57) ABSTRACT

The invention concerns the assembly of a cross-member and an instrument panel. The invention concerns an assembly method including assembling a ventilation element (40, 42) on a cross-member (26, 28), and assembling the panel instrument on the cross-member (26, 28) such that a centering device penetrates into the orifice. The method includes: prior to assembling the ventilation elements (40, 42) on the cross-member (26, 28), arranging thereon a base (10) of the centering device of reduced height so that it does not obstruct the assembling of the ventilation elements (40, 42), and, prior to assembling the instrument panel on the cross-member (26, 28), arranging, on the base (10), a body of the centering device. The invention is applicable to motor vehicle cockpits.

8 Claims, 2 Drawing Sheets

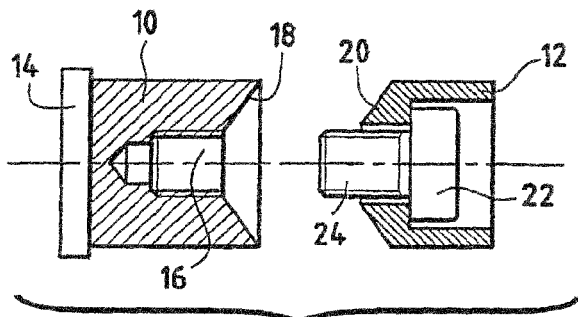
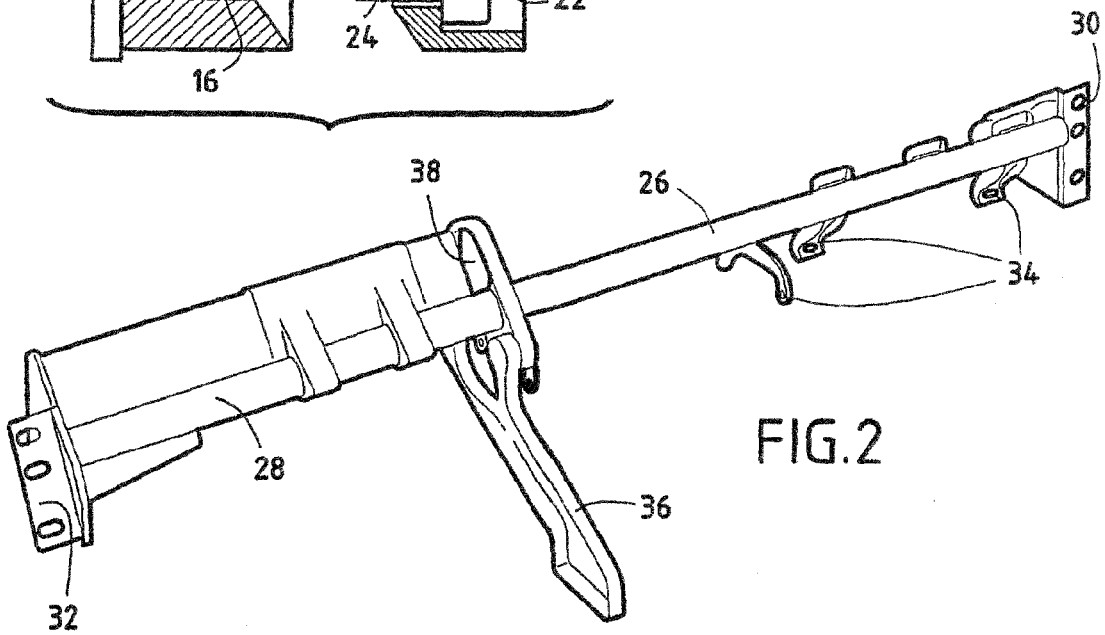
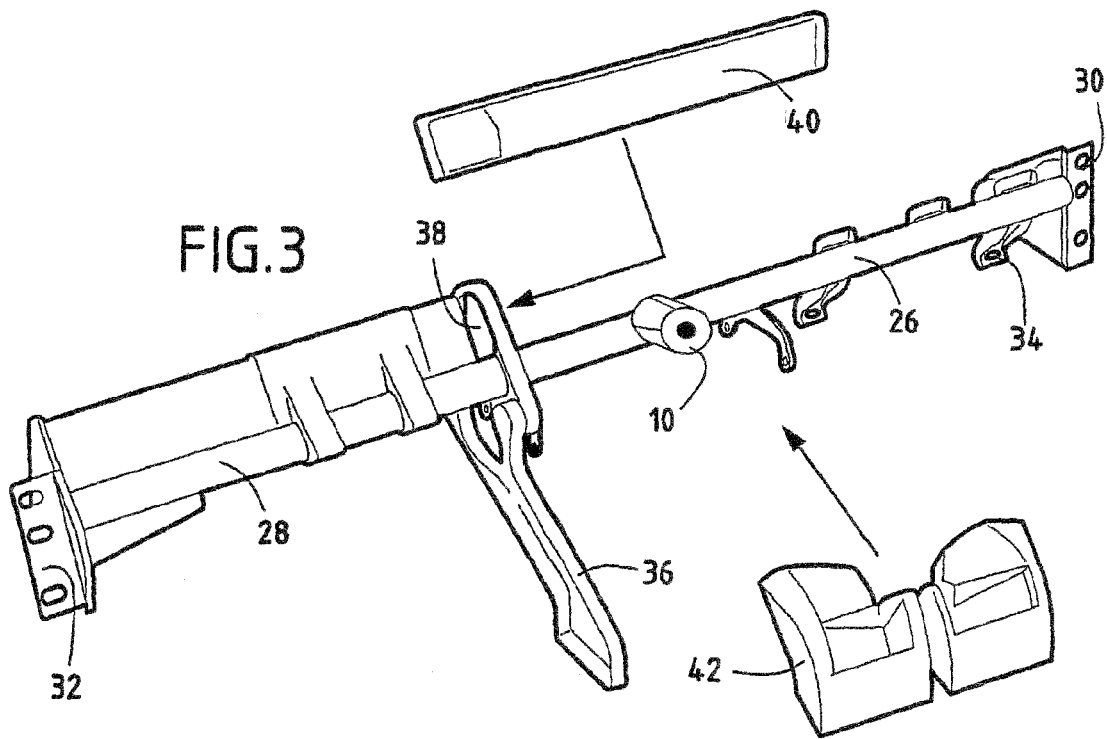

METHOD OF ASSEMBLING A CROSSBAR WITH A DASHBOARD, AND A CENTERING DEVICE

The present invention relates to a method of assembling an air-flow cross-bar with a dashboard, and also to a centering device adapted to be used in the method.

The front portion of the passenger compartment of a motor vehicle is defined by a dashboard that is usually mounted on a crossbar, generally made at least part out of metal and constituting a structural element of the vehicle. The assembly constituted by the crossbar and the dashboard is sometimes referred to as a "cockpit" and it has very many functions, in addition to its structural mechanical function, such as supporting air-flow elements, such as air conditioning ducts, inflatable airbags, the steering column, etc.

Because of its mechanical function, the crossbar generally includes at least a portion that is made of metal and that is designed to withstand forces, and it also defines spaces for air flow. Nevertheless, it is desirable for conditioning air not to be transmitted directly via such spaces; since metals possess a high degree of thermal conductivity, the metal crossbar would lead to significant losses of heat. It is therefore advantageous to place air-flow elements in the spaces defined within the metal crossbar, generally elements made of plastics material presenting low thermal conductivity.

It is possible to make the metal crossbar by longitudinally curving a metal strip so that it defines open or closed channels suitable for housing air-flow elements and for holding supports for other elements, e.g. for airbags.

When using such a crossbar in a cockpit, hatches for passing airbags are defined in the dashboard and need to be properly aligned with airbag supports carried by the crossbar. It is thus essential, in a cockpit, for the dashboard and the metal crossbar to be aligned in the appropriate position.

That is why, in a cockpit, the dashboard and the crossbar are "centered" by at least one device that may be in the form of a stud on one of the elements penetrating into an orifice in the other element. In order to reduce the ranges of manufacturing tolerances, the centering device is preferably placed more or less in the middle of the length of the crossbar, and thus of the cockpit.

Document DE-197 39 870 describes one such centering device that is fastened to a support by a bolt. The device is either completely absent or completely present.

Assembling a cockpit thus normally comprises initially assembling the air-flow elements on a metal crossbar, and then assembling the dashboard on the crossbar. Nevertheless, assembling the air-flow elements requires air-flow elements made of plastics material to be moved in the longitudinal direction of the metal crossbar while they are placed thereagainst. It can be understood that the presence of a projecting centering device prevents or at least impedes such assembly of the air-flow elements.

It is therefore possible to envisage putting the centering device into place on the crossbar after the air-flow elements have been mounted. However that operation of fastening the centering device, which is done essentially by welding, is no longer possible when the thermally fragile elements made of plastics material have already been mounted on the crossbar.

It is also possible to envisage subsequent fastening of the centering device by screw fastening on the crossbar. Nevertheless, given the configuration and the mechanical function of the crossbar, such fastening by mere screw fastening is usually undesirable, at least for reasons of positioning accuracy or of crossbar strength.

The invention relates to a solution to this problem that arises in the particular circumstance of assembling a dashboard on an air-flow crossbar when the crossbar is itself built up by moving air-flow elements longitudinally relative to a metal crossbar.

According to the invention, the problem is solved by using a centering device comprising at least one centering device that is made up of two portions: a base for fastening firmly to the metal crossbar, preferably by welding; and a centering device body that is accurately positioned on the centering device base. The centering device or stud as formed in this way makes it possible subsequently to assemble the dashboard on the crossbar simply and robustly with alignment that is very accurate.

More precisely, the invention relates to a method of assembling together an elongate air-flow crossbar and a dashboard, by relative movement between the crossbar and the dashboard in a first direction substantially perpendicular to the length of the crossbar, so that at least one centering device of the crossbar penetrates into an orifice of the dashboard in the first direction, the method being of the type that comprises:

an operation of assembling at least one air-flow element on a metal cross-bar by moving in at least one direction substantially transverse to said first direction; and an operation of assembling the dashboard onto the crossbar by moving the dashboard in the first direction so that the centering device penetrates into the orifice.

According to the invention, the method further comprises:

before the operation of assembling the air-flow elements on the metal crossbar, placing a centering device base on the metal crossbar, the base being of height that is small enough to avoid hindering the operation of assembling the air-flow elements to the metal crossbar; and after the operation of assembling the air-flow elements on the metal cross-bar, and before the operation of assembling the dashboard on the crossbar, placing a centering device body on the centering device base so that the base and the body of the centering device are fastened together.

Preferably, the centering device base is placed on the metal crossbar by a welding operation.

In an implementation, prior to assembling the air-flow elements, the method further includes fabricating the crossbar by longitudinally curving at least a metal strip. Preferably, the method also includes an operation of localized welding of the metal strip to itself.

The invention also relates to a two-portion centering device for implementing an assembly method according to any preceding paragraph, which device comprises a centering device base of small height and provided with a first fastener device, and a centering device body provided with a second fastener device, the first and second fastener devices being suitable for co-operating with each other.

Preferably, the first fastener device is a tapped hole and the second fastener device is a fastener screw.

Preferably, the centering device base and body co-operate via mutual centering members. For example, the mutual centering members may comprise a projection and a cavity, both of which are frustoconical in shape and have the same cone angle.

Other characteristics and advantages of the invention can be better understood on reading the following description of an exemplary embodiment, given with reference to the accompanying drawings, in which:

FIG. 1 is an exploded view of a centering device constituting a centering stud of the invention;

FIGS. 2 to 5 show the method of the invention, and in these figures:

FIG. 2 shows a metal crossbar prior to assembling air-flow elements and prior to mounting the stud base;

FIG. 3 shows the crossbar after the stud base has been fastened and while mounting air-flow elements;

FIG. 4 shows a crossbar on which the various elements are mounted, prior to final mounting of the stud body; and FIG. 5 shows a crossbar after final mounting of the stud body.

FIG. 1 is an exploded section of a centering device of the invention. It is constituted by two portions, a stud base 10 and a stud body 12.

Figure 4:
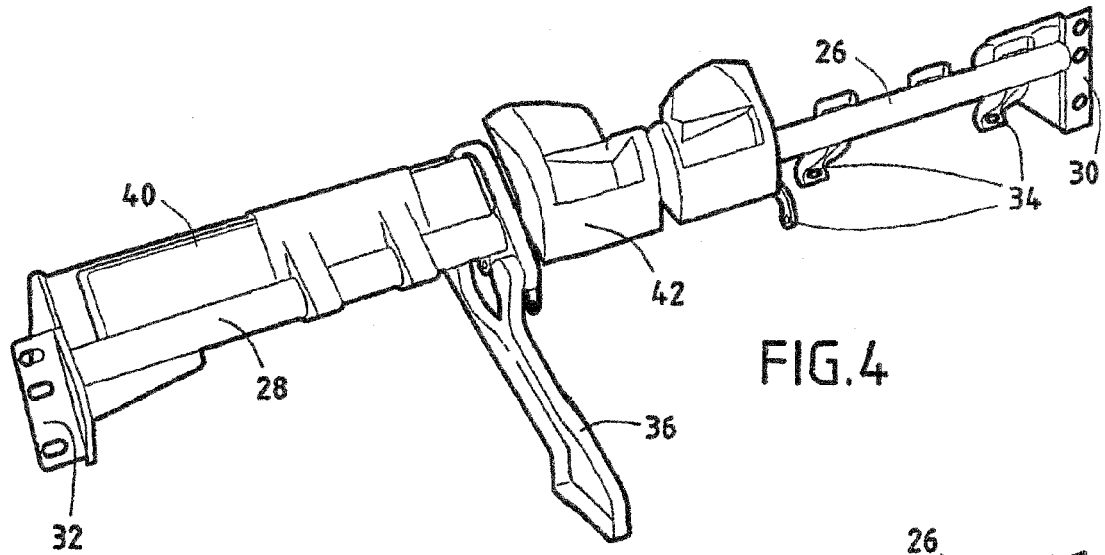

The stud base 10 possesses a portion 14 for being fastened to a crossbar, e.g. by welding. At its end opposite from the portion 14, the base 10 has an open tapped hole 16 placed in the center of a centering depression 18 of frustoconical shape.

The stud body 12 has a frustoconical projection 20 with a cone angle practically equal to that of the conical depression 18, and disposed around a hole through which there passes a screw 22 having a threaded shank 24 suitable for screwing into the tapped hole 16.

Because of the frustoconical shape of the depression 18 and of the projection 20, the stud body 12 has only one alignment position on the base 10, this position giving the centering device a shape that is cylindrical without discontinuity between the stud base and body.

The method of assembling a cockpit including a metal crossbar and a dashboard of the invention is described below.

FIG. 2 shows a metal crossbar in one embodiment of the invention. In this embodiment, the crossbar essentially comprises, in its right-hand portion, a metal tube 26 and, in its left-hand portion, a crossbar portion 28 formed by longitudinally curving and welding a metal strip. The ends of the crossbar are provided with supports 30 and 32 for securing the crossbar to the structure of the vehicle. The crossbar portion 26 carries various supports 34, in particular for inflatable bags, advantageously fastened by welding.

Preferably, a retaining arm 36 placed close to the central portion of the crossbar serves to prevent it from buckling.

The left-hand portion 28 of the dashboard, formed by curving a metal strip, performs various functions such as supporting the steering wheel and housing air-flow elements. In the particular embodiment described, an opening 38 formed in the intermediate arm 36 serves to pass an air-flow element 40, which constitutes a duct for passing a flow of air conditioning air.

In FIG. 3, it can be seen that inserting the air-flow element 40 via the opening 38 requires the crossbar to be disengaged in its portion located to the right of the opening so that the air-flow element can be presented in front of the opening and then moved lengthwise relative to the crossbar.

Before mounting air-flow elements in this way, in the method of the invention, the stud base of the centering device 10 is welded to the right-hand portion of the crossbar 26, given that it is low in height, so it does not constitute an obstacle to inserting air-flow elements. Other air-flow elements, e.g. forming a distributor, such as the element 42, can also be mounted by being moved in a direction other than the longitudinal direction of the crossbar, as shown in FIGS. 3 and 4.

In FIG. 4, it can be seen that the stud base 10 projects little, if at all, relative to the air-flow element 42. The centering device is therefore not accessible to a dashboard that is to be mounted on the fitted crossbar as shown in FIG. 4.

Figure 5:
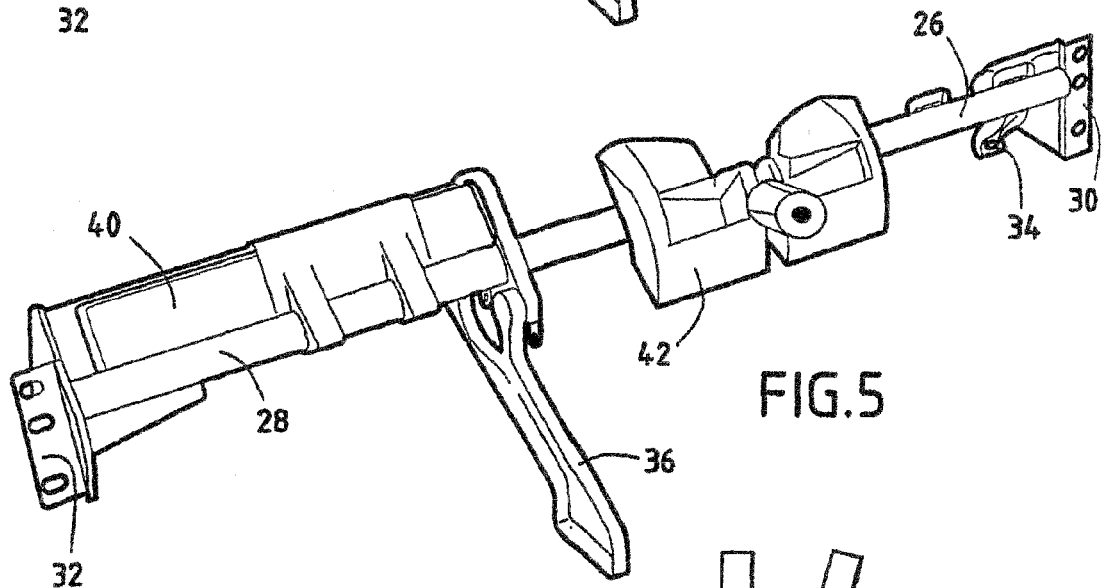
Figure 6:
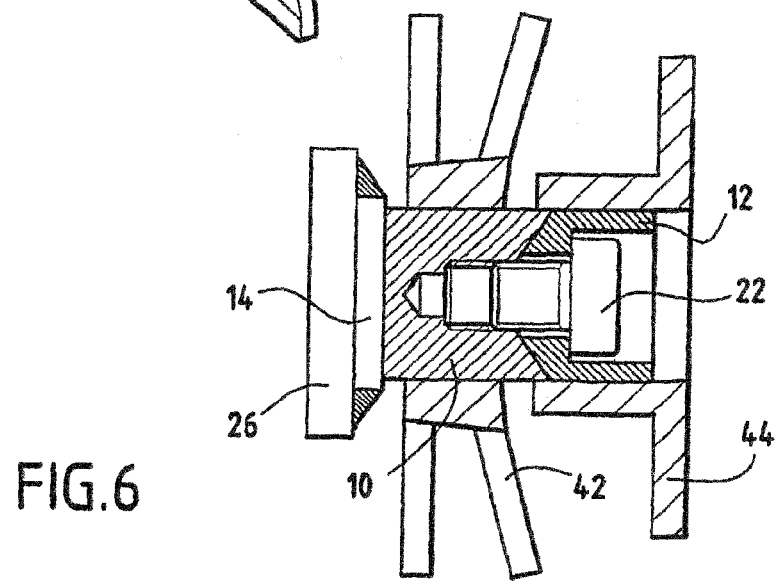
FIG. 6 is a section view of a portion of FIG. 5, showing co-operation between the dashboard and the stud.

In a subsequent operation, the stud base 10 is provided with the stud body 12, as shown in FIG. 5. FIG. 6 is a section on a larger scale showing the portion of the crossbar that passes through the center of the centering device.

As can be seen clearly in FIG. 5, after the air-flow element 42 has been mounted on the crossbar 26, around the stud base 10, the stud body 12 is screwed to the base 10, thereby forming a centering device on which it is possible to fit a centering cylinder for a dashboard, as shown in part and given reference 44.

The above-described method presents numerous advantages.

Firstly, robust fastening of the centering device is achieved by welding the stud base when fabricating the metal elements, at a time when it is possible to obtain very good positioning accuracy and very good strength.

Because of the integrated centering of the stud body on the stud base, the accurate positioning obtained during fabrication of the metal crossbar is conserved until assembly of the dashboard.

The centering device can be made out of a metal material giving it great robustness. Nevertheless, when the center device serves only for centering purposes, then the stud body may be formed in some other way, e.g. by molding a plastics material.

Although mutual centering of the stud base and body is shown as involving co-operation between frustoconical surfaces, any other centering system could be used. It is even possible to use the screw itself as the centering device, with the stud base and body then co-operating via plane surfaces.

The invention claimed is:

1. A method of assembling together an elongate air-flow crossbar and a dashboard, by relative movement between the crossbar and the dashboard in a first direction substantially perpendicular to the length of the crossbar, so that at least one centering device of the crossbar penetrates into an orifice of the dashboard in the first direction, the method being of the type that comprises:
    an operation of assembling at least one air-flow element on a metal crossbar by moving in at least one direction substantially transverse to said first direction; and
    an operation of assembling the dashboard onto the crossbar by moving the dashboard in the first direction so that the centering device penetrates into the orifice;
    the method further comprising:
    before the operation of assembling the air-flow elements on the metal crossbar, placing a centering device base on the metal crossbar, the base being of height that is small enough to avoid hindering the operation of assembling the air-flow elements to the metal crossbar; and
    after the operation of assembling the air-flow elements on the metal cross-bar, and before the operation of assembling the dashboard on the crossbar, placing a centering device body on the centering device base so that the base and the body of the centering device are fastened together.

2. A method according to claim 1, wherein the centering device base is placed on the metal crossbar by a welding operation.

3. A method according to claim 1, wherein, prior to assembling the air-flow elements, the method further includes fabricating the crossbar by longitudinally curving at least a metal strip.

4. A method according to claim 3, further including an operation of localized welding of the metal strip to itself.

5. A centering device in two portions for implementing an assembly method according to claim 1, the device comprising a centering device base of small height and provided with a first fastener device, and a centering device body provided with a second fastener device, the first and second fastener devices being suitable for co-operating with each other.

6. A device according to claim 5, wherein the first fastener device is a tapped hole and the second fastener device is a fastener screw.

7. A device according to claim 5, wherein the centering device base and body co-operate via mutual centering members.

8. A device according to claim 7, wherein the mutual centering members comprise a projection and a cavity, both of which are frustoconical in shape and have the same cone angle.

* * * * *